(12) United States Patent
Kumkar

(10) Patent No.: US 10,941,069 B2
(45) Date of Patent: Mar. 9, 2021

(54) PROCESSING A PLATE-LIKE WORKPIECE HAVING A TRANSPARENT, GLASS, GLASS-LIKE, CERAMIC AND/OR CRYSTALLINE LAYER

(71) Applicant: TRUMPF Laser- und Systemtechnik GmbH, Ditzingen (DE)

(72) Inventor: Malte Kumkar, Weimar (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 98 days.

(21) Appl. No.: 15/016,888

(22) Filed: Feb. 5, 2016

(65) Prior Publication Data

US 2016/0152508 A1    Jun. 2, 2016

Related U.S. Application Data

(63) Continuation of application No. PCT/EP2013/002366, filed on Aug. 7, 2013.

(51) Int. Cl.
*C03B 33/02*        (2006.01)
*B23K 26/40*        (2014.01)
(Continued)

(52) U.S. Cl.
CPC ...... *C03B 33/0222* (2013.01); *B23K 26/0838* (2013.01); *B23K 26/364* (2015.10);
(Continued)

(58) Field of Classification Search
CPC .............. B64C 1/06; B64C 2001/0072; B64C 2001/0081; C30B 33/04; G06F 8/38;
G06F 8/40; H04L 27/2636; H04L 5/0007; H04L 5/0051; H04L 5/006; H04W 72/085; Y02T 50/433; B42D 25/328; B42D 25/40
(Continued)

(56) References Cited

U.S. PATENT DOCUMENTS 6,722,041 B2    4/2004  Warashina et al.
6,754,429 B2    6/2004  Borrelli et al.
(Continued)

FOREIGN PATENT DOCUMENTS

CN    2228458        6/1996
CN    1371592 A     10/2002
(Continued)

OTHER PUBLICATIONS

Jungemann, Gottmann and Keggenhoff; 2010; 3D-Microstructuring of Sapphire using fs-Laser Irradiation and Selective Etching; Journal of Laser Micro/Nanoengineering vol. 5, No. 2.*
(Continued)

*Primary Examiner* — Ibrahime A Abraham
*Assistant Examiner* — Chris Q Liu
(74) *Attorney, Agent, or Firm* — Fish & Richardson P.C.

(57) ABSTRACT

A plate-like workpiece having a transparent, glass, glass-like, ceramic and/or crystalline layer, such as for use in an electronic display screen, is processed into separate segments by first incompletely severing the workpiece along outer contours of bounded segments, by forming holes through the layer with a laser beam, leaving the segments interconnected at narrow connections, and then separating the segments by severing the web-like connections.

11 Claims, 5 Drawing Sheets

(51) Int. Cl.
  *B23K 26/364* (2014.01)
  *B28D 1/22* (2006.01)
  *B23K 26/08* (2014.01)
  *H01J 9/20* (2006.01)
  *C03B 33/033* (2006.01)
  *C03C 15/00* (2006.01)
  *B23K 103/00* (2006.01)

(52) U.S. Cl.
  CPC ............ *B23K 26/40* (2013.01); *B28D 1/221* (2013.01); *C03B 33/033* (2013.01); *C03C 15/00* (2013.01); *H01J 9/20* (2013.01); *B23K 2103/50* (2018.08); *B23K 2103/52* (2018.08)

(58) Field of Classification Search
  USPC ............ 219/121.72, 121.57, 121.67, 121.85, 219/121.73, 121.78, 121.68
  See application file for complete search history.

(56) References Cited

U.S. PATENT DOCUMENTS

| | | | |
|---|---|---|---|
| 8,496,866 B2 | 7/2013 | Kluge | |
| 9,346,130 B2 | 5/2016 | Lei et al. | |
| 2004/0104200 A1* | 6/2004 | Nally | B24B 21/04 216/89 |
| 2005/0161436 A1* | 7/2005 | Yoshimura | B23K 26/0648 216/87 |
| 2008/0305615 A1 | 12/2008 | Ueno et al. | |
| 2009/0013724 A1 | 1/2009 | Koyo et al. | |
| 2009/0026185 A1 | 1/2009 | Sakamoto | |
| 2010/0147813 A1 | 6/2010 | Lei et al. | |
| 2010/0221478 A1 | 9/2010 | Kluge | |
| 2010/0291353 A1 | 11/2010 | Dejneka et al. | |
| 2011/0003619 A1* | 1/2011 | Fujii | C03C 3/083 455/566 |
| 2012/0052252 A1* | 3/2012 | Kohli | C03C 17/23 428/174 |
| 2012/0067858 A1 | 3/2012 | Kangastupa et al. | |
| 2012/0135177 A1* | 5/2012 | Cornejo | B26F 3/002 428/43 |
| 2012/0196071 A1 | 8/2012 | Cornejo et al. | |
| 2012/0305526 A1* | 12/2012 | Chen | C03C 15/00 216/41 |
| 2013/0037308 A1 | 2/2013 | Wang et al. | |

FOREIGN PATENT DOCUMENTS

| | | | |
|---|---|---|---|
| CN | 1827825 | A | 9/2006 |
| CN | 1993200 | A | 7/2007 |
| CN | 101690428 | A | 3/2010 |
| CN | 201418206 | | 3/2010 |
| CN | 201491381 | | 5/2010 |
| CN | 102271860 | A | 12/2011 |
| CN | 102271860 | A | 12/2011 |
| CN | 102497732 | | 6/2012 |
| CN | 202617514 | | 12/2012 |
| CN | 202932852 | U | 5/2013 |
| CN | 103220877 | | 7/2013 |
| CN | 101690428 | A | 3/2020 |
| EP | 1777031 | B1 | 6/2010 |
| EP | 2258512 | B1 | 8/2012 |
| JP | 2004-534269 | | 11/2004 |
| JP | 2009206291 | A | 9/2009 |
| JP | 2010-527141 | | 8/2010 |
| WO | WO2006070825 | A1 | 7/2006 |
| WO | WO2010077845 | A2 | 7/2010 |
| WO | WO20110303 | A1 | 3/2011 |
| WO | WO2011025908 | | 3/2011 |
| WO | WO2012006736 | A2 | 1/2012 |
| WO | WO 2012/075072 | | 6/2012 |
| WO | WO2013040484 | A1 | 3/2013 |

OTHER PUBLICATIONS

Bellouard, Yves, "Fabrication of high-aspect ratio, micro-fluidic channels and tunnels using femtosecond laser pulses and chemical etching", Optical Society of America, 2004, 10 pages.

Bellouard et al., "The Femtoprint Project", JLMN—Journal of Laser Micro/Nanoengineering, vol. 7, No. 1, 2012, 10 pages.

International Search Reporting from corresponding PCT Application No. PCT/EP2013/002366, dated Jul. 7, 2014, 4 pages.

Office Action in Japanese Application No. 2016-532240, dated Feb. 16, 2018, 11 pages (with English translation).

CN Office Action in Chinese Appln. No. 201380080076.3, dated Jun. 14, 2017.

* cited by examiner

PROCESSING A PLATE-LIKE WORKPIECE HAVING A TRANSPARENT, GLASS, GLASS-LIKE, CERAMIC AND/OR CRYSTALLINE LAYER

CROSS-REFERENCE TO RELATED APPLICATION

This application is a continuation of and claims priority under 35 U.S.C. § 120 to PCT Application No. PCT/EP2013/002366 filed on Aug. 7, 2013. The contents of this priority application is hereby incorporated by reference in its entirety.

TECHNICAL FIELD

The invention relates to processing a plate-like workpiece having a transparent, glass, glass-like, ceramic and/or crystalline layer, such as for processing a plate-like workpiece for producing panes for screens, a plurality of partial segments being cut out of the plate-like workpiece, and to a related severing device and produced product.

BACKGROUND

During the production of panes for a screen from a relatively large glass pane, a plurality of partial segments are cut out and are processed further as individual panes. In this case, the severing of glass or similar materials places special requirements on the separating process. The reason for this is the normally very high brittleness and hardness of such materials, which make controlled severing more difficult. For example, it is known to sever glass panels in a relatively complicated method by means of diamond cutting tools.

WO 2010/077845 A1 reveals a method for severing glass or glass-like material in which the material is removed by means of a laser beam, the laser beam also producing a chamfer at the cut edge.

A method for severing a transparent material is described, for example, in WO 2012/006736 A2. In a first step, a laser beam acts on the material at various points, by which means filaments are produced in the material. The resulting filaments run along the severing line to be produced, at which the material is subsequently cleaved. WO 2011/025908 A1 discloses a method for cutting toughened glass, in which internal stress is introduced into the glass along a severing line by means of laser radiation. By means of a following second laser irradiation, a crack is produced, which is propagated along the severing line. Similar methods are additionally described by US 2010/0291353 A1, EP 2 258 512 B1 and EP 1 777 031 B1.

In these known methods the partial segments are initially cut out of a large panel and are then processed further individually. If necessary, the individual panes can subsequently be further functionalized. Optionally, the partial segments can also be functionalized before being cut out. However, this is accompanied by the risk that the functionalized regions can be impaired during the relatively complicated severing operation of the individual panes.

SUMMARY

One of the objects of the invention is to provide a processing method, a severing device and a product made of a plate-like workpiece which permit more flexible process management and simplified workpiece handling.

According to an aspect of the invention relating to the method of processing workpieces, in order to cut out partial segments from the plate-like workpiece the partial segments are initially incompletely severed from the rest of the workpiece. During the severing operation, holes are introduced along the desired outer contour of the partial segments to be cut out. The holes extend completely through at least the one layer in the layer thickness direction.

In particular, because of the holes, severing gaps result between the partial segments to be cut out and the rest of the workpiece in each case and extend over the entire layer thickness, at least in some circumferential sections. The rest of the workpiece is to be understood to mean either the residual workpiece or other partial segments to be cut out. The residual workpiece can preferably be formed as a stabilizing residual lattice. In particular, the residual lattice can completely surround all the partial segments for this purpose, i.e. the partial segments merely form internal cutouts from the plate-like workpiece. In order to save material, it may also be advantageous to pre-sever the plate-like workpieces in such a way that no residual workpiece (residual lattice) remains, there being only partial segments to be cut out.

According to this aspect of the invention, the partial segments are initially not severed completely from the rest of the workpiece. The holes or severing gaps passing through in the layer thickness direction do not surround the partial segments completely but are arranged in such a way that the partial segments each remain connected to the rest of the workpiece by means of at least one web-like remaining connection. The web-like remaining connection is substantially narrower as compared with the longitudinal and transverse sides of the associated partial segment. In many cases, the web width, at least at the connecting point with the partial segment, amounts to less than 1% of the length or width of the partial segment. In general, at least one web-like remaining connection is left between every two continuous holes or severing gaps adjacent one another in the circumferential direction around the partial segment.

As a result of the incomplete severing, a strong composite made of the partial segments to be cut out and, if appropriate, the rest of the workpiece, remains. Only then is the separation of the partial segments carried out.

This composite has partial segments that are partially severed but connected to one another via webs, and itself is an intermediate product formed from the plate-like workpiece, according to another aspect of the invention.

Yet another aspect of the invention features a severing device by means of which such a composite can be produced from a plate-like workpiece. Preferably, the severing device is part of an overall system for processing a plate-like workpiece, which includes a separating device by means of which the incompletely severed partial segments can be separated by severing the web-like remaining connections.

Various aspects of the invention can enable the process management to be made more flexible and the workpiece handling simplified, in part because the separation does not have to be carried out early in the production process. The partial segments made from a workpiece plate can readily be handled, for example transported, jointly.

The invention finds use in plate-like workpieces which have at least one transparent, glass, glass-like, ceramic and/or crystalline layer or coating, such as a layer of silicon oxide-based transparent glass. Accordingly, the layer can in particular also have two, three or more of the named properties. The layer can therefore have all possible subcombinations of the properties listed (if not contradictory, such as in particular glass and crystalline). Suitable glass layers are, for example, layers with toughened or non-toughened glass. Sapphire is a further example of a material of a layer in which the invention may be advantageously applied.

"Transparent" means, for example, that the layer is not absorbent, or is absorbent only to a low extent, to radiation of at least one wavelength in the range from 0.1 µm to 11 µm, such as from 0.2 µm to 2 µm.

The plate-like workpiece may consist of only this one layer or coating of transparent, glass, glass-like, ceramic and/or crystalline material. Alternatively, it may also have one or more additional layers or coatings that are wholly or partially also transparent, glass, glass-like, ceramic and/or crystalline. The additional layer or layers are preferably incompletely severed in the same severing method as the one layer, and subsequently severed completely to be separated. However, it is also possible that the additional layer or layers are severed previously or later, in another way.

The invention may have particular use in the production of panes for screens. These can be, for example, large screens for flat-screen monitors or small displays for mobile telephones or other similar display devices. Panes for such screens are generally mass-produced articles that nevertheless have to meet high quality requirements.

In some cases, the partial segments are severed incompletely from the rest of the workpiece by using laser radiation. For example, this can be done by means of material-removing laser processing. The severing device can consequently be a laser processing device, for example for material-removing laser processing.

In a particularly preferred example, the incomplete severing is carried out by means of laser-induced selective etching. The general method of laser-induced selective etching is described by way of example in the specialist articles "Y. Bellouard et al., "The Femtoprint Project", JLMN Journal of Laser Micro/Nanoengineering, pages 1 to 10, Vol. 7, No. 1, 2012" and "Y. Bellouard, Fabrication of high-aspect ratio, micro-fluidic channels and tunnels using femtosecond laser pulses and chemical etching", Optics Express, pages 2120 to 2129, Vol. 12, No. 10, 2004". The content of these articles is incorporated by reference.

Laser-induced selective etching generally includes two process steps. In a first step, the material of the layer is modified by means of laser radiation. Here, substantially no removal of the material takes place, instead only structural modification in some regions. This modification may be carried out not only in regions of the surface of the layer but also in internal regions of the layer, for which purpose, however, the material must be at least partially transparent to the laser radiation used. Otherwise, the laser radiation will be absorbed in the region of the surface before modification of the internal regions can take place. Here, use is made of the fact that the desired modification of the material takes place only above a threshold value for the absorbed energy density. By precise focusing, the threshold energy density is exceeded in a small volume of the material, while the surrounding material is penetrated without noticeable modification. In the process, residual absorption can effect or bring about adequate absorption for a desired modification. Advantageously, the effect of non-linear absorption, initiated by multi-photon ionization, tunnel ionization and/or further effects, can be used. It is important that, by means of these or other effects and their combination, a suitable geometric arrangement of modified volume elements can be formed, so that the result is a selectively etchable volume. Laser-induced etching for incomplete severing is preferably used in method and product variants in which the plate-like workpiece has at least one layer of transparent material.

In a second process step, the selective etching of the layer is carried out. For example, the laser-modified workpiece is put into an etching dip bath for a specific time. The etching process can be carried out, for example, with a low-percentage aqueous solution of hydrofluoric acid. Higher selectivity can be achieved by means of etching with an alkaline solution (for example: 30% by weight KOH solution) at 85° C. in an ultrasonic bath. As a result of the previously laser-induced material modification, only the modified regions of the layer are removed by the etching. The diluted hydrofluoric acid brings the main components of the glass into solution, whereas an alkaline solution dissolves the glass network linearly as a function of time. The unmodified regions of the layer remain more or less unchanged, depending on the manifestation of the laser-induced selectivity during the etching process.

A substantial advantage of laser-induced selective material modification is a very high freedom in the shape of the holes that can be produced. For instance, even regions on the surface of the layer that faces away from the laser device can be modified, and subsequently removed during the etching without the regions of the layer located in between also having to be removed (e.g., for the formation of undercuts, reverse offsets, etc.).

A further advantage is the high quality obtainable in the resultant dividing surface. Cracks or other impairments resulting from excessively high input of heat or force, for example, may thus be avoided.

The manifestation of the selectivity of the etching on account of the laser modification can be chosen differently. For example, in some cases a certain but nevertheless reduced removal of material on the unmodified surface of the layer may be desired. Furthermore, it is possible to use masks in order to protect specific surface regions of the layer completely during etching. It is possible, in addition to the selective etching process, to provide a non-selective etching process. In a two-stage process, the laser-induced modification can initially be removed by etching, e.g., in KOH solution, and the workpiece surface can be smoothed in a subsequent, less selective etching step, such as in a diluted HF solution.

In the case of the use of laser-induced selective etching, the severing system may include a laser processing station with at least one laser processing beam for the modification of the layer. The laser processing station may include, for example, a scanner optics unit and/or be equipped with movement axes overlaying one another, in order to permit a highly dynamic laser processing process.

The severing system in this case may also include at least one etching station, such as an etching dip bath.

Use is preferably made of a laser beam in particular having a pulse duration between 100 and 10,000 femtoseconds and/or having a wavelength between 0.2 and 2 µm.

In a preferred variant, the laser beam before the focusing optics has at least virtually a fundamental mode (beam quality factor M2<1.5) or a fundamental mode with phase singularity (vortex, beam quality factor M2<3). In some cases the laser beam is beam-shaped.

In some examples at least one web-like remaining connection is formed which, at least in some sections, has a web thickness that is reduced in comparison with the layer thickness. In this sense, the formed intermediate product consequently has at least one correspondingly formed web-like remaining connection. In this way, it is ensured that the web can be severed more easily than other regions of the plate-like workpiece.

In some examples at least one web-like remaining connection is formed which has at least one intended fracture point at a connecting point to the associated partial segment. The intended fracture point can be produced by a reduced thickness of the web at this point, a material weakening by means of local stresses and/or perforations, or by channels. The intended fracture point may be introduced during the incomplete severing, preferably during the laser-induced selective etching.

In absolute values, a web width and/or thickness at the connecting point which is less than 50 µm is preferred. For example, the layer of the plate-like workpiece or the workpiece overall may have a thickness of 0.1 to 10 mm. The area of the partial segments to be cut out is, for example, 5 to 3000 cm$^2$.

In general it should be noted that, if an advantageous formation of at least one web-like remaining connection is explained above or below, it is of particular advantage if a multiplicity of web-like remaining connections (if provided at all) is formed in a corresponding way. Preferably, at least virtually all the web-like remaining connections are formed largely uniformly.

In the case of a particularly preferred exemplary embodiment, at least one web-like remaining connection is formed, the connecting point of which to the outer contour of the associated partial segment is set back with respect to at least one outer edge of the partial segment in the layer thickness direction and/or in the direction of the plane of the partial segment. In this way, at least on one side of the partial segments, a circumferentially uniform edge geometry can be provided. As a result of the reverse offset, it can also be made possible for the dividing surfaces of the connecting points, which are formed during the separation and are possibly of lower quality than the dividing surfaces which are formed by the incomplete severing, to be invisible in the subsequent end product or to be concealed by the edges.

In order to avoid potential reworking of the partial segments, in a preferred exemplary embodiment an edge geometry is introduced along the outer contour of the partial segments, which differs from a circumferential sharp edge. This edge geometry is introduced as early as during the incomplete severing of the partial segments. For example, a radius, a chamfer, a groove and/or a reverse offset can be introduced. The result is a product having partial segments connected via web-like remaining connections which have appropriately shaped edges. In particular, this additional workpiece processing can be carried out without significant additional cost by means of the laser-induced selective etching.

To help eliminate additional separate processing steps or processing stations, further modification may be made to the partial segments, during the incomplete severing of the partial segments, such as additional structuring. The structuring may for example be provided in the form of holes, inner contours, surface structurings, blind holes, undercuts or other flexible 3D structurings of the partial segments. Alternatively or in addition, during the incomplete severing a modification of optical or mechanical material properties may also be performed. Examples of this include the regional change of the diffraction index, the introduction of optical lattice structures, of inner markings and/or of targeted stress zones. This yields a product with partial segments that are connected by way of web-like residual connections and which are structured and/or modified. Such structurings or modifications can be implemented in a particularly simple and flexible manner by way of laser-induced selective etching.

The separation of the partial segments can be carried out in very different ways, including with a different severing method than the incomplete severing of the partial segments. Vibration-induced, thermally induced or laser-induced fracture, as well as a material removing method by means of a laser beam, for example, are each advantageous.

The separation, i.e., the severing of the web-like remaining connections, may be carried out by means of mechanical fracture. In some cases, a section of the plate-like workpiece is moved about a fracture line relative to another section, e.g. rotated, so that the sections are separated from one another by means of fracturing the plate-like workpiece along the fracture line. This process can be repeated many times along different fracture lines until all the partial segments have been separated. The fracture lines are preferably straight. This is made possible in particular by respectively multiple connecting points of web-like remaining connections being arranged with the outer contours of the partial segments each along a straight line, which in each case defines one of these straight fracture lines. In addition, a residual lattice that may possibly be present can likewise have intended fracture points or holes along the straight fracture lines.

For example, the web-like remaining connections can also be placed under tensile stress, preferably individually, for severing. In order to place individual web-like connections under tensile stress, auxiliary holes may be introduced into the rest of the workpiece in a region which adjoins the connecting point of the web-like remaining connection to the rest of the workpiece (e.g. the residual workpiece, in particular the residual lattice). The auxiliary holes may be configured in such a way that the connecting points together with the web-like remaining connection can be forced away more easily and individually from the attached partial segment. The tensile stress that can be introduced in this way effects fracture of the web-like remaining connections.

A related system for processing the plate-like workpiece has a separating device which is designed to carry out the possible separating methods described above. In addition, the (intermediate) product of the plate-like workpiece has partial segments which are connected via web-like remaining connections, wherein the remaining connections are formed and arranged for the separating methods described.

In some cases, between the incomplete severing and the separation of the partial segments, further processing of the partial segments is carried out. During this processing, the partial segments are still connected to one another via web-like remaining connections. As compared with the processing of individual partial segments, the result is simpler handling and possibly a shortening of the processing time. For example—if a layer of glass is present—glass toughening can be carried out prior to separation.

In some cases, the web-like connections are configured in such a way that the connecting regions of the outer contour of the partial segments to which the web-like remaining connections are attached are also toughened during glass toughening. This is achieved in particular by the web-like connections having a thickness and/or width such that diffusion to the connecting regions can take place. In this regard, the web width and/or thickness, at least at the connecting points, may be less than 50 µm. Alternatively or additionally, the toughening of the connecting regions can also be assisted by micro-channels which are introduced in the region of the connecting points, preferably by means of laser-induced etching.

By means of the processing, however, further functionalization and integration of further functions or else components can be carried out on the partial segments. Thanks to the simplified subsequent separating process, the risk of damaging the functionalized or more highly integrated partial segments is lower than in the case of separation without preparatory disconnection. The intermediate product made of the plate-like workpiece is accordingly provided with processed partial segments connected via web-like remaining connections.

The related system for processing the plate-like workpiece can include a processing device which is suitable for carrying out processing of the partial segments, such as with the processing described above, connected after the severing device and before the separating device.

DETAILED DESCRIPTION

Figure 1:
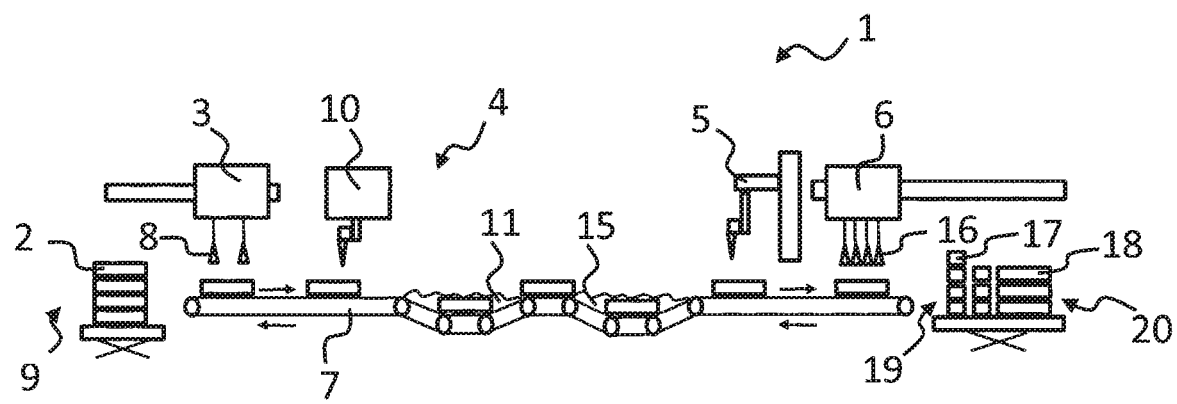
FIG. 1 shows an installation for processing plate-like workpieces, in particular of glass panels for producing glass panes for screens.

FIG. 1 shows a system 1 for processing a plate-like workpiece. In particular the system is designed to process a plate-like workpiece from an individual transparent glass layer. In particular, processing of a glass panel 2 for the production of individual panes for use in screens is carried out by the system.

The system 1 comprises, from left to right in FIG. 1, a loading device 3, a severing device 4, a further processing device 5 and a separating device 6, which in this example is also an unloading device. A conveyor belt 7 is used to transport the glass panels 2 in FIG. 1 from left to right. In the following text, the individual components of the system 1 will be described more extensively.

The loading device 3 has, for example, a suction frame having a plurality of suction grippers 8, by means of which a glass panel 2 can be gripped from above while on a workpiece stack 9, and deposited on the conveyor belt 7.

The severing device 4 is in this example a device for laser-induced selective etching, by means of which incomplete severing of partial segments 17 of the glass panel 2 is carried out, leaving web-like remaining connections. Device 4 has a laser processing device 10 and at least one etching dip bath 11.

The laser processing device 10 focuses a laser beam 12 (FIG. 2) on various regions of the glass panel 2. For this purpose, the laser processing device 10 has, for example, a laser optics unit, not shown, by means of which the focus of the laser beam 12 can be moved along a plurality of movement axes—possibly movement axes also overlaying one another—relative to the glass panel 2. The laser beam 12 is preferably a pulsed laser beam 12. Use is preferably made of a laser beam 12 with a pulse duration between 100 and 10,000 femtoseconds. The wavelength of the laser beam 12 preferably lies between 0.2 and 2 μm. The raw laser beam has, at least virtually, a fundamental mode and a beam quality factor of M2<1.5.

Figure 2:
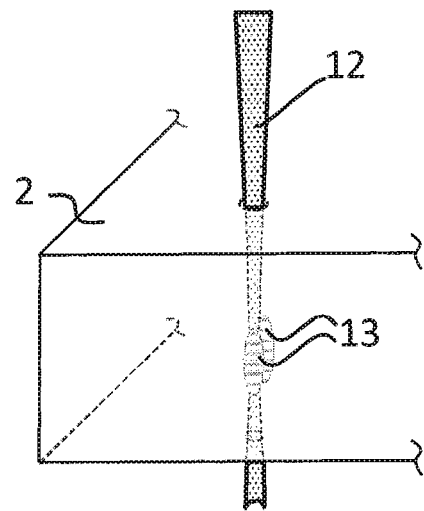
FIG. 2 shows a basic illustration of the modification of an internal region of a transparent glass panel by means of a laser beam.

FIG. 2 schematically illustrates modification of the material by the laser processing device 10. In general, the laser beam 12 can pass through the glass panel 2, which is largely transparent to the wavelength of the laser beam. Only in the region of the laser focus is modification of the material carried out by means of non-linear absorption of the laser beam. In this way, a multiplicity of continuous regions can be modified gradually. In FIG. 2, two adjacent modified regions 13 disposed in the interior of the glass panel 2 are shown by way of example. In one example, an individual modified region 13 has an extent of 1 to 20 μm parallel to the laser beam axis and an extent of 0.5 to 5 μm perpendicular to the laser beam axis.

Referring back to FIG. 1, connected downstream of the laser processing device 10, the severing device 4 has at least one etching dip bath 11 in which the glass panels 2 are immersed. In this example, the etching dip bath 11 is provided with an alkaline solution, e.g. a 30% by weight KOH solution, at 85° C. The etching solution, the dwell time of the glass panels 2 in the etching dip bath 11, the temperature of the etching solution, and the type of laser modification are coordinated with one another in such a way that the modified regions 13 are removed, while the unmodified regions do not dissolve or dissolve only to a substantially lower extent. A region that is to be removed, which can comprise a plurality of modified regions 13, should adjoin the surface of the glass panel 2 and should not be enclosed by unmodified regions, in order that the etching solution can reach said region to be removed.

Connected downstream of the etching dip bath 11 is a further dip bath 15 for removing residues of the etching solution. However, it is also possible for still further etching dip baths, not shown, and a device for applying etching protection masks and so on, to be provided.

The processing device 5, which is connected downstream of the severing device 4, is used for example for glass toughening or for further functionalization or integration of further functions or components on the incompletely separated partial segments 17.

The separating device 6 is provided, in a manner comparable with the loading device 3, with a plurality of suction grippers 16, which are able to grip the glass panel 2 from above. The grippers 16 can be raised and lowered independently of one another by a separating stroke, so that the grippers 16 can move, for example twist, various regions of a fixed glass panel 2 in relation to each other. As a result of the relative movement, the web-like remaining connections are broken and thus the partial segments 17 separated. The separated partial segments 17 and, if appropriate, a residual lattice 18, are deposited on various stacks 19, 20 by means of the separating device 6.

In summary, the processing of the glass panels 2 in the installation 1 can be described as follows. First, the glass panels 2 are deposited on the conveyor belt 7 by means of the loading device 3. At the separating device 4, a plurality of partial segments 17 are incompletely severed from the rest of the workpiece by means of laser-induced etching. In the process, holes which go through the glass panel 2 are introduced along the outer contour of the partial segments 17. However, the partial segments 17 still remain connected to the rest of the workpiece by web-like remaining connections. The product which thus results may be subjected to further processing (glass toughening, functionalization, integration) at the processing device 5. The partial segments 17 are then separated at the separating device 6 by severing the web-like remaining connections and are deposited on stacks 19, 20.

Figure 3:
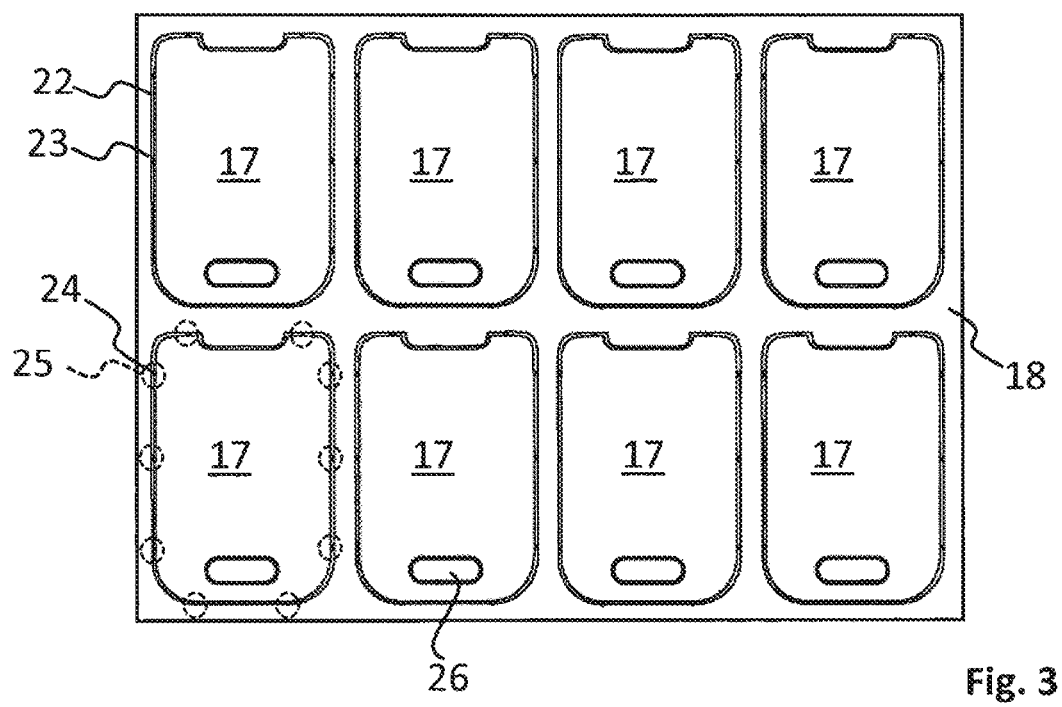
FIG. 3 shows a first example of a product from a plate-like workpiece, such as a glass panel, having a plurality of partial segments connected via web-like remaining connections.

FIG. 3 shows a plan view of an example of an intermediate product 21 from the glass panel 2 after leaving the severing device 4. The product 21 has a plurality of partial segments 17, which are in each case severed incompletely from the rest of the workpiece in preparation for the following separation. The partial segments 17 are identical. Formed along their outer contour 22 are holes 23, which are interrupted by a plurality of web-like remaining connections 24. The remaining connections are illustrated in FIG. 3 only by black dots, the positions of which are illustrated by dashed circles 25, using the example of one of the partial segments 17. Overall, eight partial segments 17 are separated incompletely and are surrounded by a residual lattice 18. The partial segments 17 each have an internal cutout 26, which has likewise been produced on the severing device by laser-induced selective etching.

Figure 4:
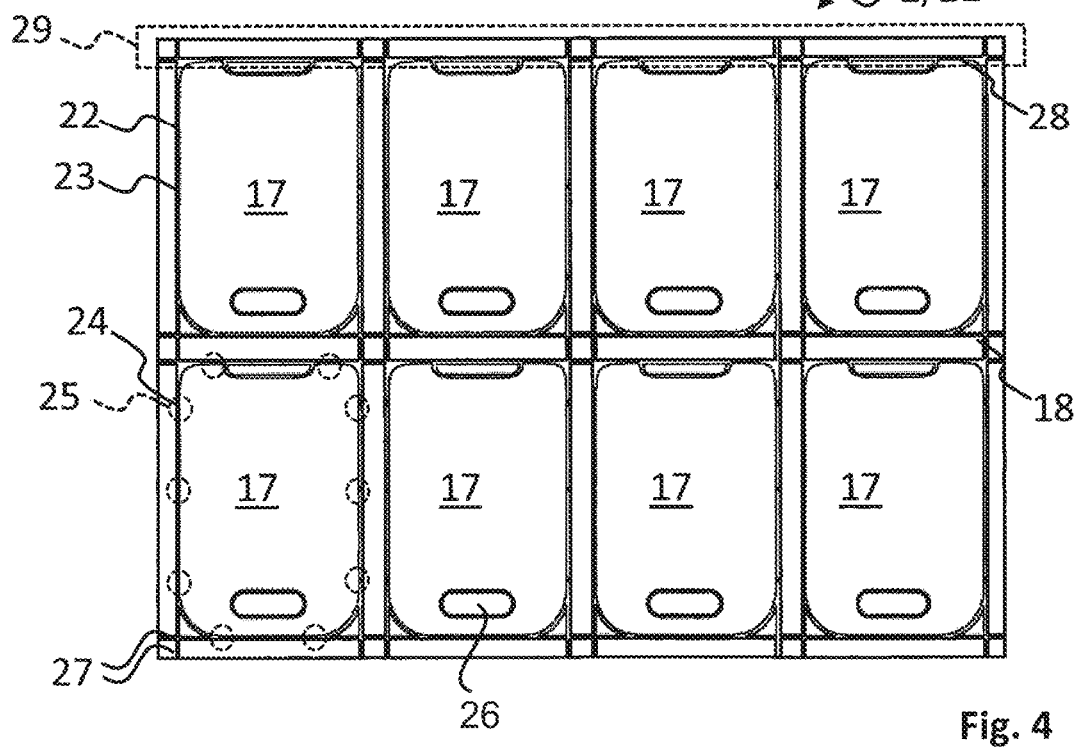
FIG. 4 shows a second example of a product from a plate-like workpiece, such as from a glass panel, having a plurality of partial segments connected via web-like remaining connections.
Figure 5:
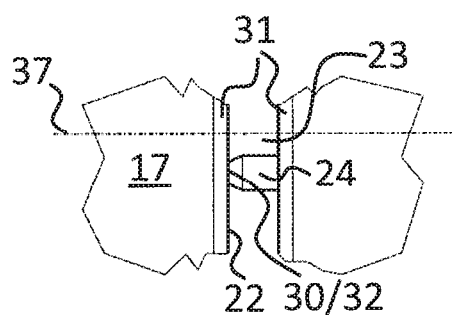
FIG. 5 is a plan view of a first example of a web-like remaining connection of an intermediate product made from a plate-like workpiece, such as from a glass panel.
Figure 6:
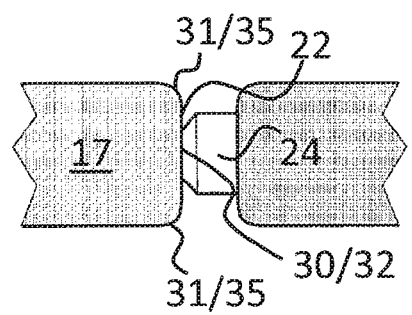
FIG. 6 is a section view taken along line 37 in FIG. 5.
Figure 7:
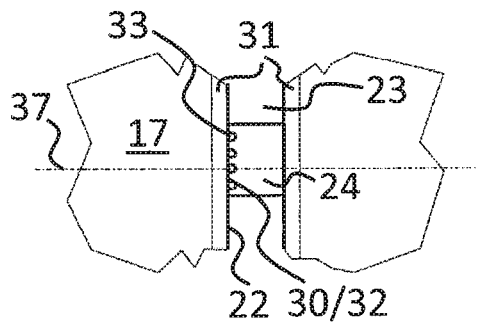
FIG. 7 is a plan view of a second example of a web-like remaining connection of an intermediate product made from a plate-like workpiece, such as from a glass panel.
Figure 8:
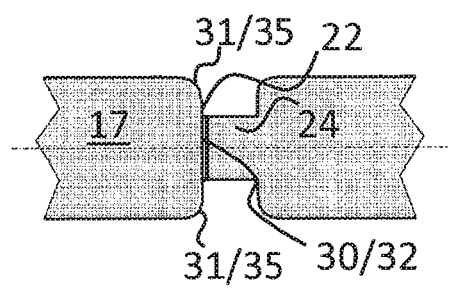
FIG. 8 is a section view taken along line 37 in FIG. 7.
Figure 9:
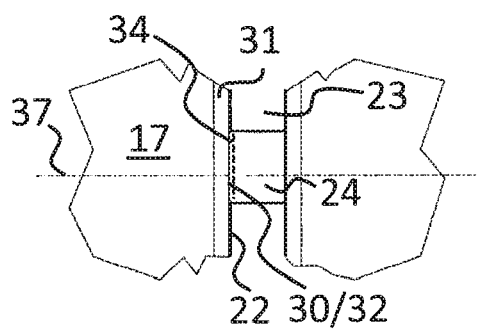
FIG. 9 is a plan view of a third example of a web-like remaining connection of an intermediate product made from a plate-like workpiece, such as from a glass panel.
Figure 10:
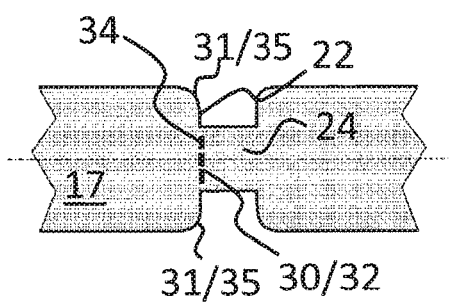
FIG. 10 is a section view taken along line 37 in FIG. 9.
Figure 11:
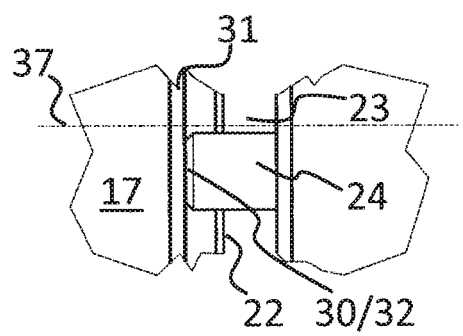
FIG. 11 is a plan view of a fourth example of a web-like remaining connection of an intermediate product made from a plate-like workpiece, such as from a glass panel.
Figure 12:
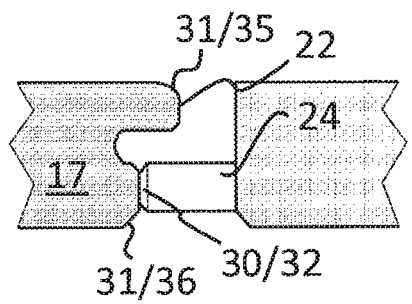
FIG. 12 is a section view taken along line 37 in FIG. 11.

FIG. 4 shows a further example of a product 21 from the glass panel 2 following the incomplete severing operation. The partial segments 17 are formed identically, like those of the example according to FIG. 3. The residual lattice 18 differs from the residual lattice 18 of the example according to FIG. 3, however. The residual lattice 18 is pierced by rectilinear holes 27 which extend in extension of the rectilinear holes 23 on the outer contour 22 of the partial segments 17. Thanks to these holes 27 in the residual lattice 18, entire strip-like sections of the glass panel 2 can be moved in relation to one another in order to separate the partial segments 17, all of the web-like remaining connections 24 arranged along the resultant straight fracture line 28 being severed. By way of example, such a strip-like section is emphasized in FIG. 4 by a dashed outline 29.

In the following text, four examples are described as to how the web-like remaining connections 24 of the product 21 from the glass panel 2 can be configured following the incomplete severing operation. In FIGS. 5 to 12, a detail of the product 21 in the region of a web-like remaining connection 24 is shown. FIGS. 5, 7, 9 and 11 each show a plan view of the detail, i.e. the glass panel main plane extends parallel to the drawing plane. FIGS. 6, 8, 10 and 12 each show a sectional illustration of the detail in a section plane 37 indicated in FIGS. 5, 7, 9 and 11, respectively, the glass panel main plane extending perpendicular to the drawing plane.

All the examples correspond in that the web-like remaining connection 24 has a web thickness that is reduced as compared with the glass panel thickness. The web thickness and/or width is in particular less than 50 µm.

The connecting points 30 of the web-like remaining connections 24 to the outer contour 22 of the associated partial segments 17 are set back in the glass panel thickness direction as compared with both outer edges 31 of the partial segment 17. In the example according to FIGS. 11 and 12, the connecting point 30 is additionally set back in the direction of the glass panel main plane with respect to the upper outer edge 31.

All the web-like remaining connections 24 shown have an intended fracture point 32 at the connecting point 30 to the outer contour of the associated partial segment 17. In the examples shown in FIGS. 5 and 6 and also 11 and 12, the intended fracture point 32 is formed by a reduction in the web width and thickness toward the connecting point 30. In the example shown in FIGS. 7 and 8, the intended fracture point 32 is formed by weakening on account of a plurality of micro-channels 33. In the example shown in FIGS. 9 and 10, the intended fracture point 32 results from material stresses 34. The micro-channels 33 and/or the material stresses 34 have been introduced during the laser-induced selective etching by means of laser modification at the connecting point 30. The micro-channels 33 additionally have the possible advantage of aiding in the toughening of the connecting regions of the outer contour 22 of the partial segments 17 at the connecting points 30.

The partial segments 17 have an edge geometry that deviates from a sharp edge. Thus, the examples shown in FIGS. 5 to 10 have a radius 35 extending about both outer edges 31. In the example shown in FIGS. 11 and 12, the upper outer edge 31 also has a radius 35 but the lower outer edge 31 has a chamfer 36. The edge geometries shown have been produced during the laser-induced selective etching.

Figure 13:
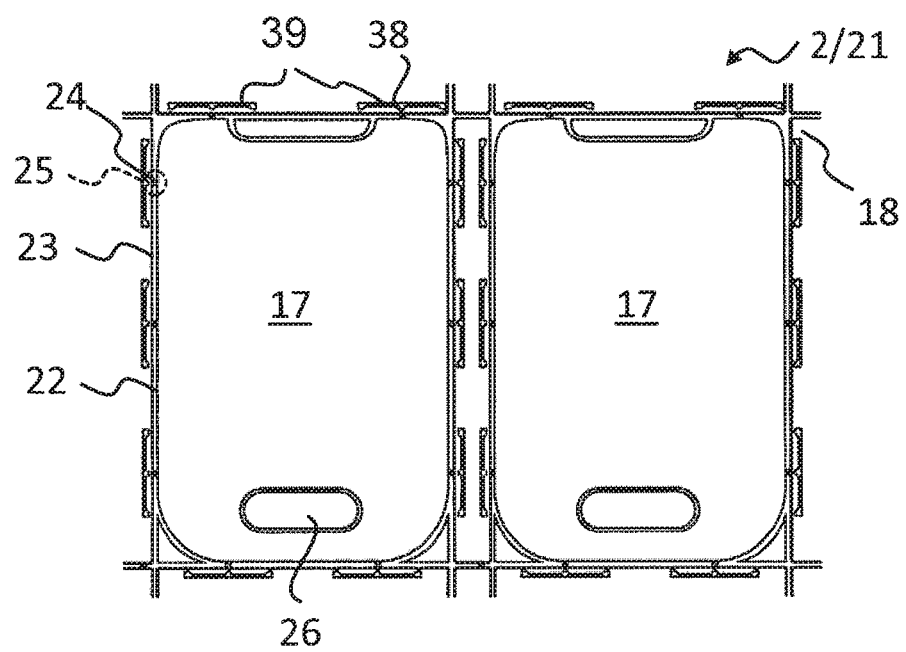
FIG. 13 shows a detail from a third example of a product made from a plate-like workpiece, such as from a glass panel, having a plurality of partial segments connected via web-like remaining connections.

FIG. 13 shows, as a detail, a third example of a product 21 from the glass panel 2 following the incomplete severing operation, largely coinciding with the example according to FIG. 4. It differs from the example shown in FIG. 4 in that the residual lattice 18 of the product 21 of FIG. 13 has auxiliary or weakening holes 39. Each web-like remaining connection 24 has an associated auxiliary hole 39. The auxiliary holes 39 are formed in a region which adjoins the residual lattice 18 at the connecting points 38 of the web-like remaining connections 24. The auxiliary holes 39 are configured in such a way that the connecting points 38 together with the web-like remaining connections 24 can be forced away from the attached partial segments 17 more easily and individually, in order to fracture the web-like remaining connections 24 during separation of the partial segments 17. The auxiliary holes 39 have been introduced by means of laser-induced selective etching during the incomplete severing.

By way of example, a description has been given of a system 1 and a processing method in which the incomplete severing, additional processing and the separation of the partial segments 17 are carried out in a flow process. Alternatively, however, the processing method can also be carried out at different individual stations.

A number of embodiments of the invention have been described. Nevertheless, it will be understood that various modifications may be made without departing from the spirit and scope of the invention. Accordingly, other embodiments are within the scope of the following claims.

What is claimed is:

1. A method for processing a plate-like workpiece having a layer of a transparent glass, ceramic, or crystalline material to form a plurality of partial segments of the plate-like workpiece, the method comprising:
   providing a plate-like workpiece comprising a layer of a transparent glass, ceramic, or crystalline material;
   forming a plurality of partial segments within the plate-like workpiece by incompletely severing the partial segments from the rest of the workpiece by
      forming holes along an outer contour of each partial segment by laser-induced selective etching, such that the formed holes each extend completely through a thickness of said layer, leaving each partial segment connected to other portions of the workpiece by one or more web-like connections; and
      forming at least one of the web-like connections by laser-induced selective etching to have a connecting point at a lower outer edge of a partial segment, wherein the lower outer edge is set back with respect to an upper outer edge of the partial segment in a direction of a principal plane of the partial segment to form an undercut or a reverse offset with respect to the upper edge; and
   separating the partial segments from the plate-like workpiece by severing the one or more web-like connections.

2. The method of claim 1, wherein at least one of the web-like connections is formed to have a thickness, at least in some regions, that is reduced in comparison with an overall thickness of the layer.

3. The method of claim 1, wherein at least one of the web-like connections has at least one of a reduced web width and a reduced web thickness towards the connection point to an associated partial segment, to define at least one fracture point.

4. The method of claim 1, further comprising forming an edge geometry at an outer edge of each of the partial segments.

5. The method of claim 4, wherein the edge geometry comprises one of an edge radius, an edge chamfer, and a groove in one or both of the lower outer edge and the upper outer edge.

6. The method of claim 4, wherein the edge geometry is formed as the partial segments are incompletely severed.

7. The method of claim 1 further comprising, during the incomplete severing of the partial segments, processing the partial segments modifying an optical or mechanical material property of each partial segment.

8. The method of claim 1 wherein the severing of the web-like remaining connections is performed by a different severing method than the incomplete severing of the partial segments.

9. The method of claim 8, wherein the severing of the web-like connections is performed by mechanical fracture.

10. The method of claim 1, further comprising, between the incomplete severing of the partial segments and the severing of the web-like connections, glass toughening of the partial segments.

11. The method of claim 10, wherein dimensions of the web-like connections are selected such that connecting regions of the outer contours of the partial segments to which the web-like remaining connections are attached are toughened during the glass toughening.

* * * * *